(12) United States Patent
Minelly et al.

(10) Patent No.: US 7,835,608 B2
(45) Date of Patent: Nov. 16, 2010

(54) METHOD AND APPARATUS FOR OPTICAL DELIVERY FIBER HAVING CLADDING WITH ABSORBING REGIONS

(75) Inventors: John D. Minelly, Mill Creek, WA (US); Jason D. Henrie, Snohomish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 374 days.

(21) Appl. No.: 11/688,854

(22) Filed: Mar. 20, 2007

(65) Prior Publication Data
US 2007/0230884 A1 Oct. 4, 2007

Related U.S. Application Data

(60) Provisional application No. 60/743,626, filed on Mar. 21, 2006.

(51) Int. Cl.
G02B 6/36 (2006.01)
(52) U.S. Cl. ................... 385/126; 385/144; 385/50
(58) Field of Classification Search ............ 385/27, 385/29, 123–127, 141, 142, 144
See application file for complete search history.

(56) References Cited

U.S. PATENT DOCUMENTS

| | | | |
|---|---|---|---|
| 4,815,079 A | | 3/1989 | Snitzer et al. |
| 5,121,460 A * | | 6/1992 | Tumminelli et al. .......... 385/126 |
| 5,131,069 A * | | 7/1992 | Hall et al. .................... 385/142 |
| 5,216,728 A * | | 6/1993 | Charlton et al. ............... 385/27 |
| 5,231,465 A * | | 7/1993 | Huang et al. ................. 356/464 |
| 5,363,234 A * | | 11/1994 | Newhouse et al. ...... 359/341.32 |
| 5,774,488 A * | | 6/1998 | Kmetec ......................... 707/5 |
| 5,864,645 A | | 1/1999 | Zellmer et al. |
| 5,926,600 A * | | 7/1999 | Pavlath ....................... 385/142 |
| 6,157,763 A | | 12/2000 | Grubb et al. |
| 6,167,177 A * | | 12/2000 | Sandstrom et al. .......... 385/100 |
| 6,236,496 B1 * | | 5/2001 | Yamada et al. ......... 359/341.33 |
| 6,249,630 B1 * | | 6/2001 | Stock et al. .................. 385/123 |
| 6,459,068 B1 * | | 10/2002 | Yamaura et al. ......... 219/121.6 |
| 6,498,888 B1 * | | 12/2002 | Chenard et al. .............. 385/127 |
| 6,922,504 B2 * | | 7/2005 | Yano ........................... 385/33 |
| 7,050,686 B2 * | | 5/2006 | Farroni et al. ................ 385/123 |
| 7,050,689 B2 * | | 5/2006 | Wipiejewski et al. ........ 385/129 |
| 7,215,860 B2 * | | 5/2007 | Engelberth et al. .......... 385/127 |
| 7,418,835 B2 * | | 9/2008 | Nguyen et al. ................ 65/389 |

(Continued)

*Primary Examiner*—Sarah Hahm
(74) *Attorney, Agent, or Firm*—Charles A. Lemaire; Jonathan M. Rixen; Lemaire Patent Law Firm, P.L.L.C.

(57) ABSTRACT

Apparatus and method for distributed absorption of pump light over a length of delivery fiber that is, for example in some embodiments, fusion spliced to an end of a multiply clad gain fiber that has significant unused pump light at the end of the gain fiber. In some embodiments, this includes coupling a fiber amplifier to a passive-core delivery fiber that includes a distributed pump dump. In some embodiments, at an output end of the amplifying fiber there is still a significant amount of pump power. If all this pump power is dumped in one small place (e.g., at a splice between the amplifying fiber and a passive delivery fiber) a hot spot will result, leading to unreliable devices that fail (have catastrophic changes in operating performance). The present invention provides a distributed pump dump built into a delivery fiber that is passive to the signal in its core.

57 Claims, 7 Drawing Sheets

U.S. PATENT DOCUMENTS

2003/0053773 A1* 3/2003 Ainslie et al. ............... 385/123
2003/0234978 A1* 12/2003 Garito et al. ............. 359/341.5
2006/0140565 A1* 6/2006 Ikeda et al. ................. 385/126

* cited by examiner

FIG. 1A
BASIC CONCEPT

FIG. 1B
GRAPH OF PUMP POWER VS. LENGTH

FIG. 1C
(NOT TO SCALE)

FIG. 1D
GRAPH OF PUMP POWER AND REFLECTED SIGNAL POWER VS. LENGTH

RAMAN-SUPPRESSION CORE PROFILES

HIGH-POWER SYSTEM TO REMOVE HIGH PUMP POWER

METHOD AND APPARATUS FOR OPTICAL DELIVERY FIBER HAVING CLADDING WITH ABSORBING REGIONS

CROSS-REFERENCE TO RELATED APPLICATIONS

This claims priority to U.S. Provisional Patent Application No. 60/743,626 filed on Mar. 21, 2006, titled "METHOD AND APPARATUS FOR OPTICAL DELIVERY FIBER HAVING CLADDING WITH ABSORBING REGIONS", which is hereby incorporated by reference in its entirety. This invention is related to U.S. Provisional Patent Application No. 60/693,579 filed on Jun. 24, 2005, titled "APPARATUS AND METHOD FOR A HIGH-GAIN DOUBLE-CLAD AMPLIFIER", U.S. patent application Ser. No. 11/426,302 filed on Jun. 23, 2006 (now U.S. Pat. No. 7,526,167), titled "APPARATUS AND METHOD FOR A HIGH-GAIN DOUBLE-CLAD AMPLIFIER", U.S. patent application Ser. No. 11/567,740 filed Dec. 7, 2006 (now U.S. Pat. No. 7,570,856), titled "APPARATUS AND METHOD FOR AN ERBIUM-DOPED FIBER FOR HIGH-PEAK-POWER APPLICATIONS", and U.S. patent application Ser. No. 11/420,729 filed May 26, 2006 (now U.S. Pat. No. 7,391,561), titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD", which are all hereby incorporated by reference in their entirety.

STATEMENT REGARDING FEDERALLY SPONSORED RESEARCH OR DEVELOPMENT

This invention was made with Government support under contract W31P4Q-04-C-R025 awarded by the U.S. Army. The Government has certain rights in the invention.

FIELD OF THE INVENTION

The invention relates generally to high-power optical fiber amplifiers and lasers and more particularly to methods and apparatus for forming an amplifier or laser using a plurality of fiber segments including a delivery fiber having a pump dump with at least one distributed pump-light absorbing region.

BACKGROUND OF THE INVENTION

The broad gain bandwidth of conventional fiber-laser systems allows for operation over a wide range of wavelengths, or even tunable operation. For the simplest fiber laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

It is desirable to produce high peak and average powers from fiber lasers and amplifiers. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth (RE) doped fiber with a large core. The large core provides two benefits: Spreading the light over a larger core decreases the intensity driving the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system.

Stimulated Brillouin Scattering (SBS) is a well-known phenomenon that can lead to power limitations or even the destruction of a high-power fiber-laser system due to sporadic or unstable feedback, self-lasing, pulse compression and/or signal amplification.

Even when a fiber amplifier or fiber laser is designed to compensate for the above effects, there will be a limit on the maximum power that can be obtained from a single fiber when scaling to larger fiber sizes and/or lengths, pump powers, and the like.

U.S. Pat. No. 6,157,763 issued Dec. 5, 2000 to Grubb et al., titled "Double-clad optical fiber with improved inner cladding geometry" and is incorporated herein by reference. This patent described a double-clad optical fiber having an inner cladding with a cross-sectional shape that is non-circular, but that maintains a good end-coupling profile. The introduction of different surface variations into the cross-sectional shape of the inner cladding results in reflective patterns through the cladding that must relatively quickly intersect the core, and such a design is shown in U.S. Pat. No. 4,815,079 to Snitzer et al., which is also incorporated herein by reference. U.S. Pat. No. 5,864,645 to Zellmer, et al. issued Jan. 26, 1999 titled "Double-core light-conducting fiber, process for producing the same, double-core fiber laser, and double-core fiber amplifier", which is also incorporated herein by reference. The cross-sectional cladding shapes and other aspects described in these patents can be used in some embodiments of the present invention.

It is desirable to prevent or reduce the output of pump-wavelength power from a fiber amplifier or laser. There is a need for improved laser systems, particularly fiber lasers and fiber optical amplifiers having reduced pump-wavelength output power.

BRIEF SUMMARY OF THE INVENTION

In some embodiments, the invention provides methods and apparatus for coupling a fiber amplifier to a passive-core delivery fiber that includes a distributed pump dump. Some fiber amplifiers have multiple cladding layers, wherein the core, having a high index of refraction, contains, guides, and amplifies the signal wavelength, and is surrounded by an inner cladding, having a lower index of refraction, contains, guides, and delivers the pump wavelength over the length of the core, and is in turn surrounded by an outer cladding having an even lower index of refraction to contain the pump light in the inner cladding. In some embodiments, at an output end of the amplifying fiber there is still a significant amount of pump power (e.g., tens, hundreds, or thousands of watts of pump-wavelength power). If all this pump power is dumped in one small place (e.g., at a splice between the amplifying fiber and a passive delivery fiber) a hot spot will result, leading to unreliable devices that fail (have catastrophic changes in operating performance).

As used herein, the optical signal (the signal) is light of the signal wavelength being amplified or of the laser output (and may or may not be modulated with information), and the optical pump is light of the wavelength used to input optical energy and power to the optical amplifier or laser. As used herein, absorbing/absorbent material and/or dopants each mean a species (such as rare-earth ions) that are added to at least a portion of an optical fiber to absorb at least one wavelength without substantial re-radiation of stimulated emission. As used herein, active or signal dopants each mean a species (such as rare-earth ions) that are added to at least a portion of an optical fiber to absorb at least a pump wavelength and to provide stimulated-emission amplification of a signal wavelength (i.e., a species that absorbs pump light and amplifies signal light).

Accordingly, some embodiments of the present invention provide a delivery fiber with a distributed absorbing region between the end of the output amplifying fiber and the location where the signal light is delivered. In some embodiments, the absorbing region is doped with one or more elements (e.g., cobalt, thulium, or some other metal or rare-earth element) selected for their ability to absorb the pump and/or signal wavelengths and as a result, to heat up, or in some cases to re-radiate fluorescence isotropically. The distributed absorbing region not only absorbs a desired amount of the pump and/or signal light (converting the light's energy into heat or fluorescence), but also spreads the energy dissipation over an extended region, thus reducing hot spots that would lead to device failure. In some embodiments, the distributed pump-dump delivery fiber uses a reduced concentration of the absorbing material and an increased length, in order to reduce the amount of absorbed power per unit length and further spread the heat. In some embodiments, the concentration of absorbing material is low at the end of the distributed pump-dump delivery fiber that is fused to the amplifying fiber, and the concentration of absorbing material gradually increases towards its opposite delivery end. In some embodiments, a plurality of distributed pump-dump delivery fiber sections as spliced together, wherein a first section having a low concentration of absorbing material is fused to the amplifying fiber, and successive sections have higher concentrations of absorbing material until a last absorbing section having the highest concentration of absorbing material. In some embodiments, an endcap having no core is spliced to the end of the delivery fiber, in order that the very-high-power signal light disperses at least somewhat before it encounters the end facet, in order to increase the beam diameter and reduce the power concentration of the signal beam at the output facet (thus reducing the danger of optical damage to the output facet.

In some embodiments, the present invention provides a distributed pump-dump delivery fiber that has a double taper or change in doping concentration, wherein the doping concentration for pump-wavelength absorbent increases from the amplifier-fiber end towards the output facet end, while the doping concentration for signal-wavelength absorbent increases from the output facet end towards the amplifier-fiber end. For example, in some embodiments, there is a significant amount of signal power reflected by the output facet (e.g., a 5% end-facet-reflection of a 1000-watt signal beam results in 50 watts of signal reflected back into the delivery fiber cladding). Thus, in some embodiments, the lowest concentration of pump-wavelength absorber is at the amplifier-fiber end of the distributed pump-dump delivery fiber and increases in concentration towards the output end, while the lowest concentration of signal-wavelength absorber is at the output end of the distributed pump-dump delivery fiber and increases in concentration towards the amplifier-fiber end. In some embodiments, the distributed pump-dump delivery fiber is made of a plurality of segments spliced together and spliced to the end of the amplifying fiber, which, in some embodiments, is a double-clad fiber having a signal-carrying core, a pump-carrying inner cladding, and a low-index outer cladding. For example, in a system having a three-segment distributed pump-dump delivery fiber, the first segment, having a low concentration of pump-wavelength absorbing material and a high concentration of signal-wavelength absorbing material is fused or otherwise spliced to the signal output end of the amplifying fiber, the second segment having a medium concentration of pump-wavelength absorbing material and a medium concentration of signal-wavelength absorbing material is fused or otherwise spliced to the signal output end of the first segment, and the third segment having a high concentration of pump-wavelength absorbing material and a low concentration of signal-wavelength absorbing material is fused or otherwise spliced to the signal output end of the second segment. In some embodiments, fused or otherwise spliced to the end of the third segment is an endcap having an angled end facet (cleaved and/or polished and/or antireflective coated, in some embodiments).

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

Stimulated Brillouin Scattering (SBS) can lead to power limitations or even the destruction of a high-power fiber-laser system due to sporadic or unstable feedback, self-lasing, pulse compression and/or signal amplification.

One way to generate output with more controlled attributes is to use a master-oscillator power-amplifier (MOPA) architecture. In some embodiments, the low-power oscillator is optimized to generate a laser seed signal having the appropriate characteristics, such as controlled linewidth and wavelength, and the seed signal is input to that power amplifier, which is used to increase the output power and/or pulse energy to much higher levels.

Recent advances in high-power fiber lasers have shown that fiber lasers are one of the most efficient solid-state lasers that have the capability to generate kW-order output power with very good beam quality. The process to scale up the output power of a single-fiber laser to a higher power level faces significant challenges since nonlinear effects, thermal loading, fiber damage, as well as the required pump power and brightness of pump laser diodes (LDs) will limit the maximum output power. Several approaches have been demonstrated to scale up output power by combining multiple lasers. Multi-core phase-locked fiber lasers that use the evanescent coupling between multiple cores of a fiber to achieve coherent combining significantly reduce nonlinear processes within the fiber core. The laser configuration is simple and robust, but the maximum power is still limited by available pump power and brightness of LDs as is the case in the single-fiber system. Coherent beam combining of multiple fiber lasers using the master-oscillator power-amplifier (MOPA) configuration solves the power limitation, but the system is very complicated and must solve phase-control, optical-alignment and stability issues.

Figure 1A:
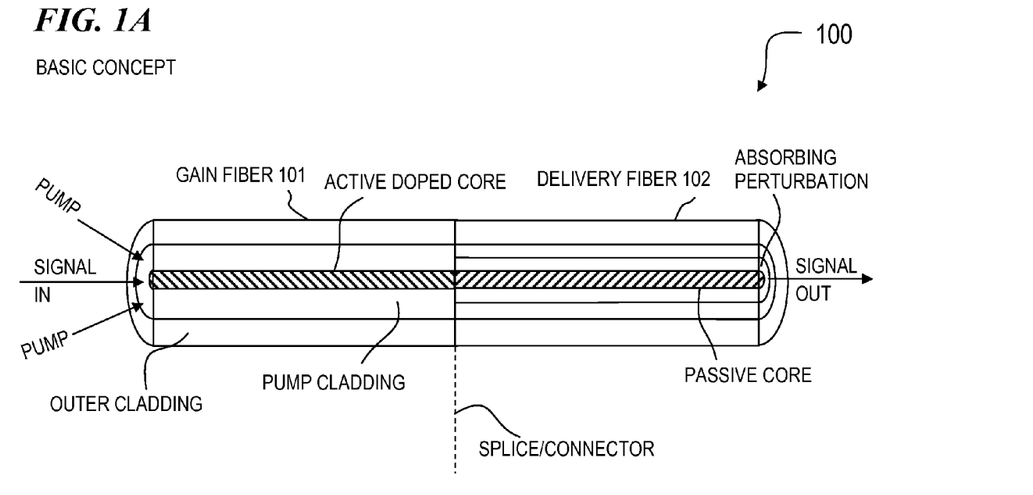
FIG. 1A is a schematic cross-sectional view of a length of a fiber amplifier and delivery fiber system 100.

FIG. 1A is a schematic cross-sectional view of a length of a fiber amplifier and delivery fiber system 100. In some embodiments, system 100 includes a gain fiber segment 101 and a distributed pump-dump fiber segment 102. Gain fiber segment 101 includes a doped core that obtains pump light from an inner cladding and amplifies a seed signal that is launched into its left end, traveling left to right. Pump light is guided by an outer cladding having a lower index, and travels left-to-right, entering the core along its length to provide pump power to the core. Distributed pump-dump fiber segment 102 is fusion spliced onto the right end of the gain fiber segment, and has a substantially or nominally transparent core that guides the amplified signal received from the core of the gain-fiber segment towards the right, and an inner cladding having a distributed attenuation structure, such as one or more regions doped with a material that absorbs pump light (which enters the inner cladding of the distribution fiber from the inner cladding end of the gain-fiber segment) to generate heat or fluorescence, and thus to dissipate energy over a significant portion of its length.

Figure 1B:
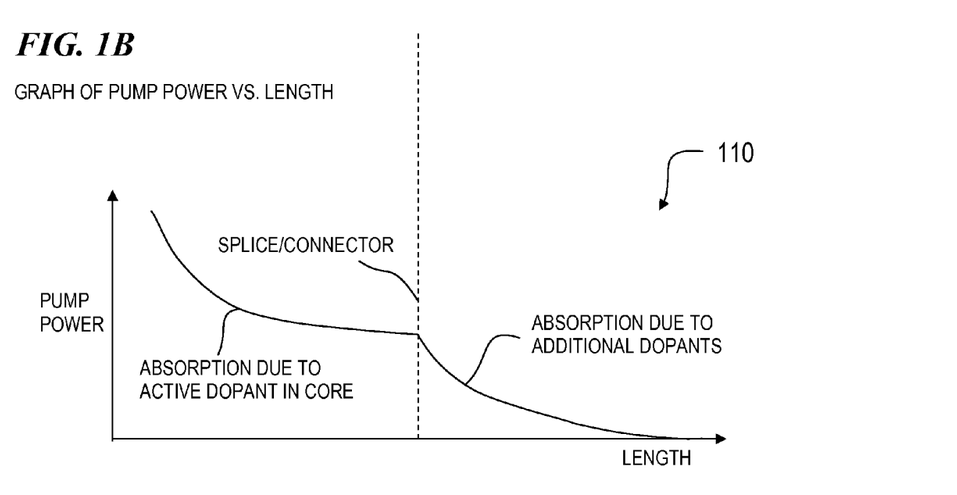
FIG. 1B is a graph 110 of pump power versus length along fiber amplifier and delivery fiber system 100.

FIG. 1B is a graph 110 of pump power versus length along fiber amplifier and delivery fiber system 100.

Figure 1C:
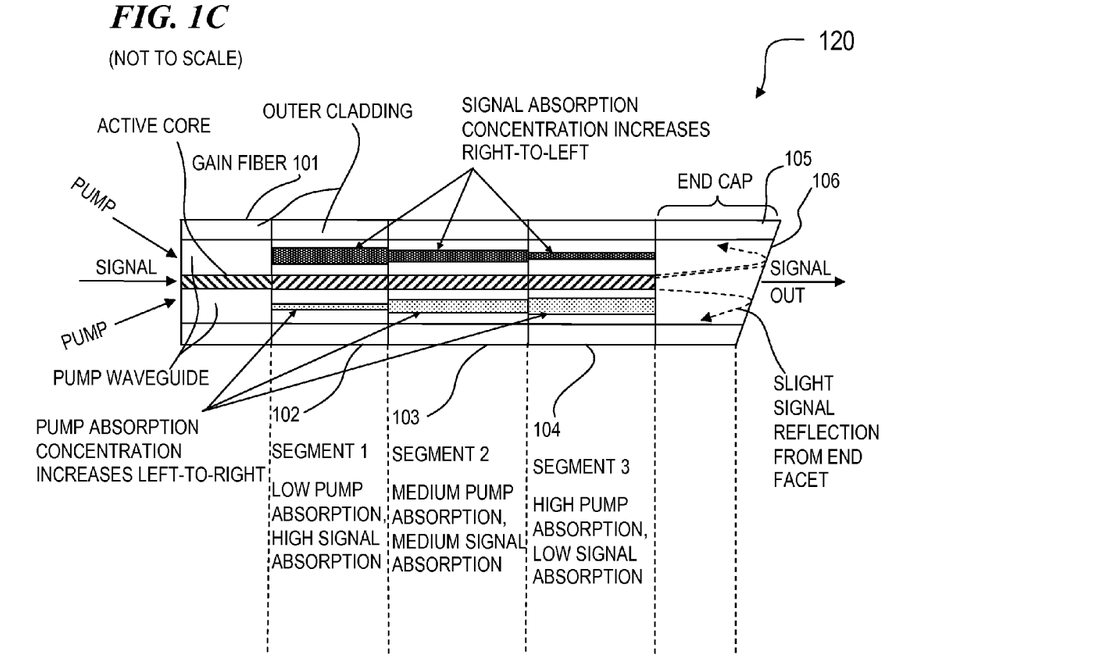
FIG. 1C is a schematic cross-sectional view of a length of a fiber amplifier and delivery fiber system 120.
Figure 5:
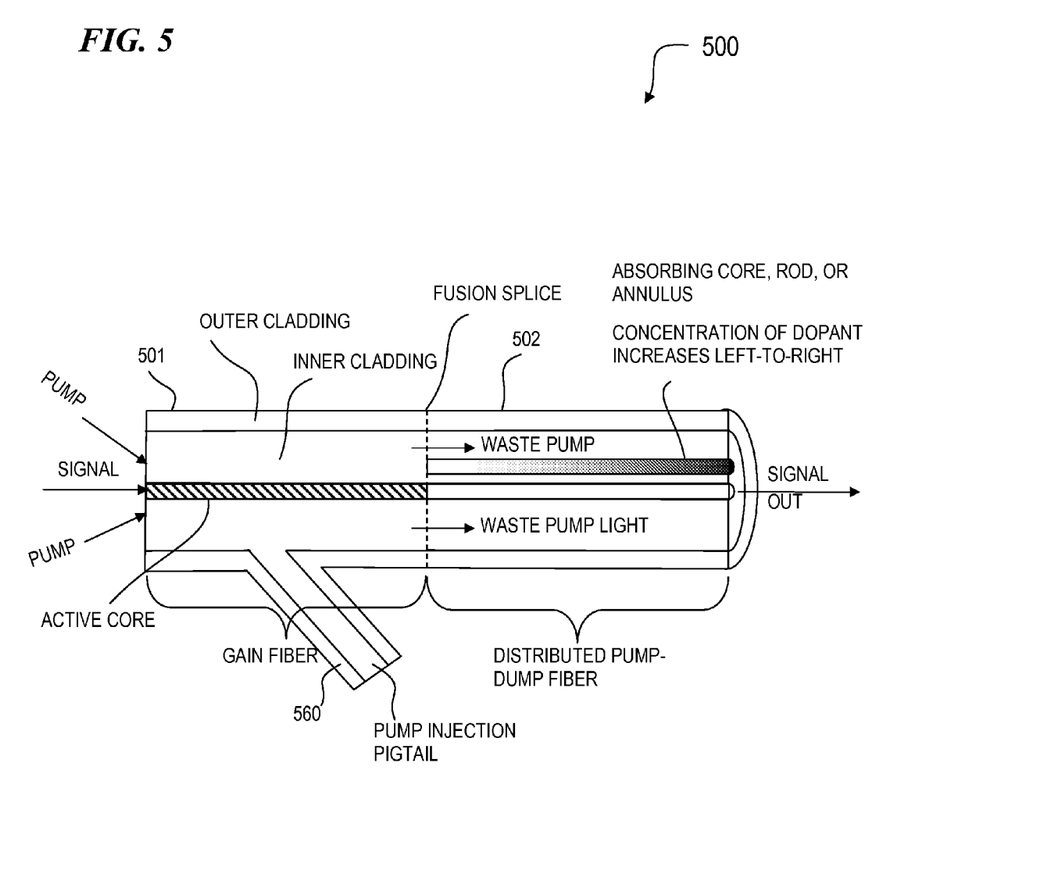
FIG. 5 is a lengthwise cross section schematic of a length of a fiber amplifier and delivery fiber system 500 having a pump-light injection pigtail 560 spliced into a side of the gain fiber segment 501.

FIG. 1C is a schematic cross-sectional view of a length of a fiber amplifier and delivery fiber system 120. In some embodiments, system 100 includes a gain fiber segment 101 and three distributed pump-dump fiber segments 102, 103 and 104. Distributed pump-dump fiber segment 102 is fusion spliced onto the right end of the gain fiber segment, and has a substantially or nominally transparent core that guides the amplified signal received from the core of the gain-fiber segment towards the right, and an inner cladding having a low-absorption distributed attenuation structure, such as one or more regions lightly doped with a material that absorbs pump light (which enters the inner cladding of the distribution fiber from the inner cladding end of the gain-fiber segment) to generate heat or fluorescence, and thus to dissipate energy over a significant portion of its length. Segment 103 is fusion spliced to segment 102, and segment 104 is fusion spliced to segment 103. Segment 102 is lightly doped with a material that absorbs pump light, segment 102 is moderately doped with a material that absorbs pump light, and segment 104 is more heavily doped with a material that absorbs pump light, in order that energy is more evenly dissipated along their lengths. In some embodiments, segment 102 is more heavily doped with a material that absorbs signal light, segment 102 is moderately doped with a material that absorbs signal light, and segment 104 is lightly doped with a material that absorbs signal light, in order that energy is more evenly dissipated along their lengths. In some embodiments, an endcap 105 with no core is fusion spliced to the end of or otherwise formed on segment 104. The signal-absorbing material in the inner cladding of one or more of the delivery segments 104, 103, and 102 helps attenuate any signal that may have reflected towards the left from end facet 106. In other embodiments, rather than discrete segments 102, 103, and 104, a continuous gradual increase in absorbing dopant is provided along the delivery fiber. The increasing concentration of pump-absorbing dopant from left to right (whether in steps as shown in FIG. 1C or continuous as shown in FIG. 5) helps to more evenly distribute energy from pump dumping.

Figure 1D:
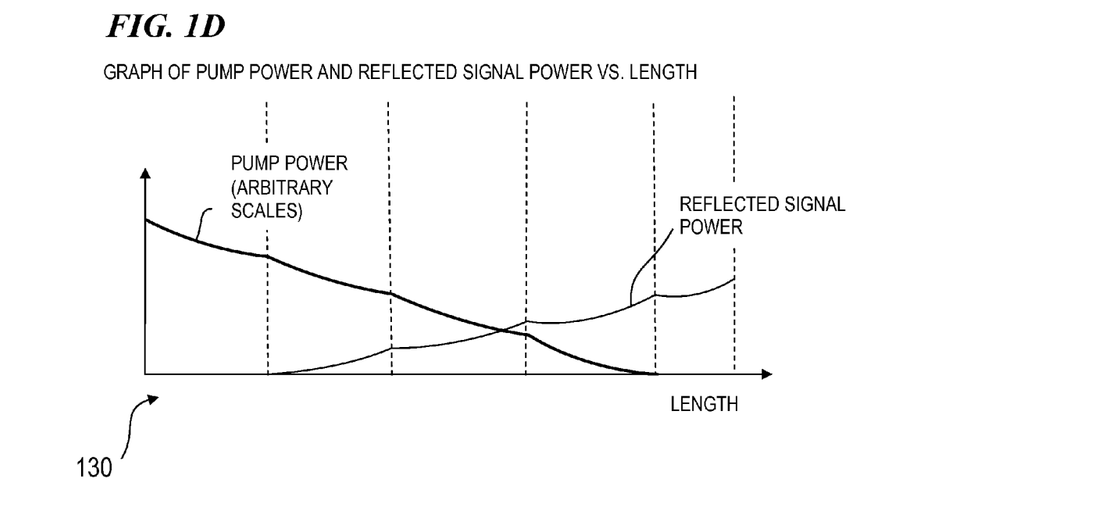
FIG. 1D is a graph 130 of pump power versus length and of signal power versus length along fiber amplifier and delivery fiber system 120.

FIG. 1D is a graph 130 of pump power versus length and of signal power versus length along fiber amplifier and delivery fiber system 120.

Figure 2:
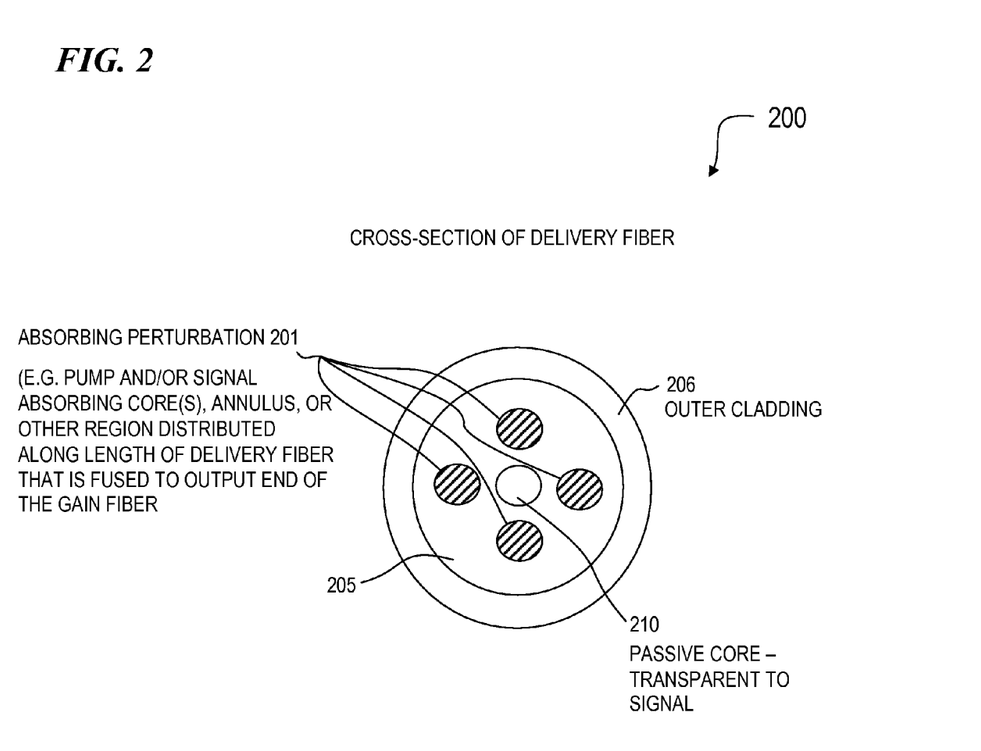
FIG. 2 is a schematic transverse cross-sectional view of a distributed pump-dump fiber segment 200.

FIG. 2 is a schematic transverse cross-sectional view of a distributed pump-dump fiber segment 200. In the embodiment shown, four pump and/or signal absorbing regions 201 (e.g., longitudinal cylinders, in some embodiments) are located in the inner cladding 205, which is surrounded by outer cladding 206. Transparent core 210 carries the desired signal that is being delivered, while pump and/or signal absorbing regions 201 serve to dump pump power (convert it to heat and/or fluorescence over a length of the delivery fiber 200.

Figure 3A:
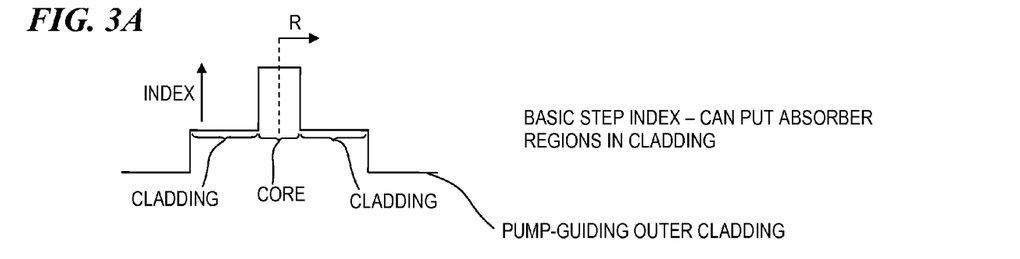
FIG. 3A shows a graph of the index profile of a first delivery-fiber embodiment.
Figure 3B:
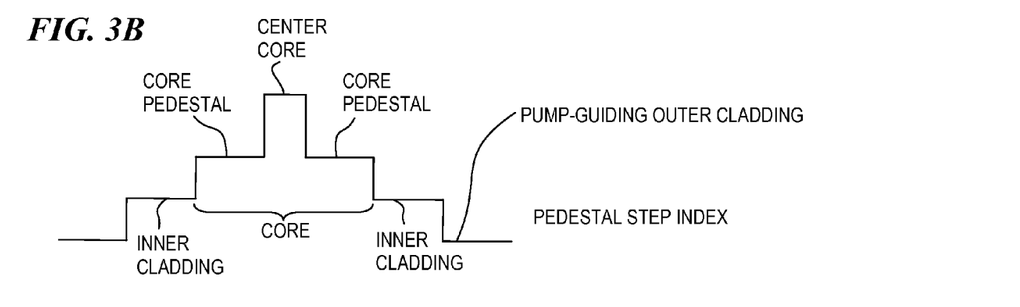
FIG. 3B shows a graph of the index profile of a second delivery-fiber embodiment.
Figure 3C:
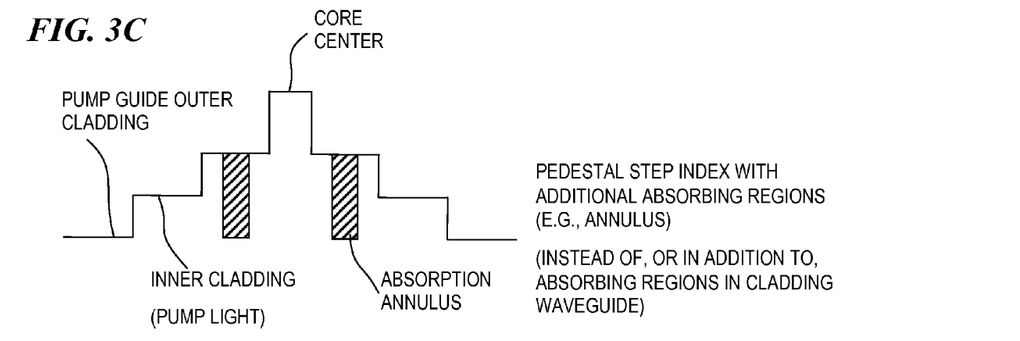
FIG. 3C shows a graph of the index profile of a third delivery-fiber embodiment.

FIGS. 3A, 3B, and 3C show some variants of inner core's index-of-refraction cross-section profiles. FIG. 3A shows a graph of the index profile of a first delivery-fiber embodiment. FIG. 3B shows a graph of the index profile of a second delivery-fiber embodiment. FIG. 3C shows a graph of the index profile of a third delivery-fiber embodiment.

Figure 4A:
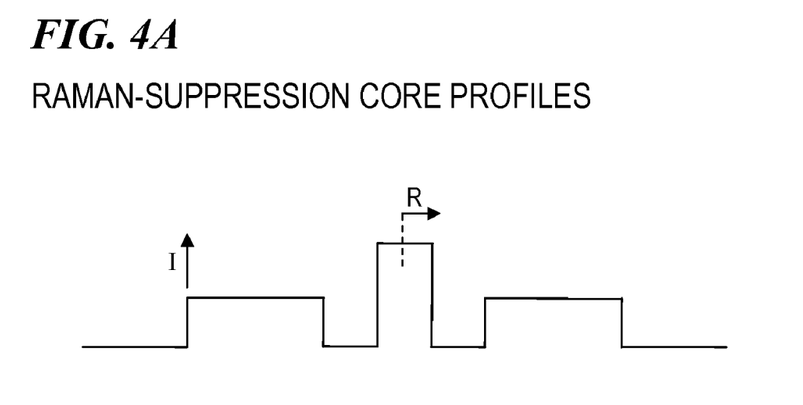
FIGS. 4A, 4B, and 4C show three graphs of the index profiles of different delivery fiber embodiments that serve to suppress Raman radiation.
Figure 4B:
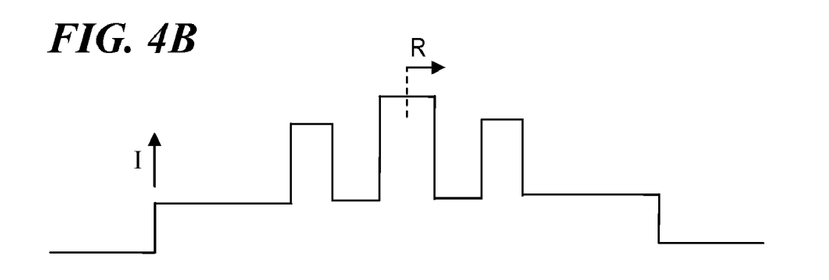
Figure 4C:
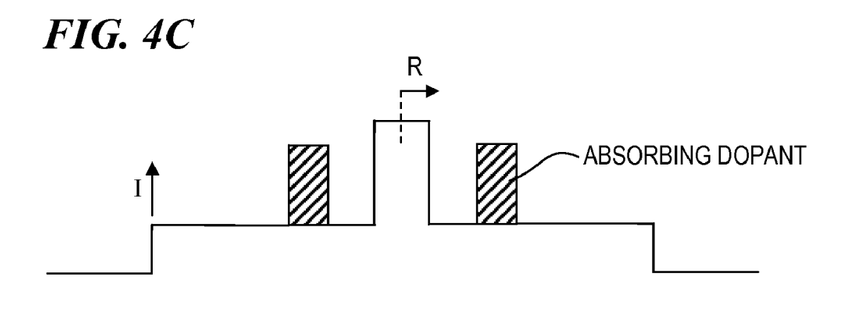

FIGS. 4A, 4B, and 4C show three graphs of the index profiles of different delivery fiber embodiments that serve to suppress Raman radiation.

FIG. 5 is a lengthwise cross section schematic of a length of a fiber amplifier and delivery fiber system 500 having a pump-light injection pigtail 560 spliced into a side of the gain fiber segment 501. In some embodiments, distributed pump-dump fiber segment 502 includes a pump-light absorption structure (such as an annulus or one or more rods) whose absorption concentration gradually and continuously increase as we move to the right along the delivery fiber segment. In some embodiments, the curve of dopant concentration increase is designed such that a constant amount of energy is dissipated per unit length along at least a portion of distributed pump-dump fiber segment 502. In some embodiments, pump injection port 560 is designed such that pump light injected there travels only right-to-left, in order that increased pump power is delivered where the signal is strongest. Thus, only waste pump light that was injected at the left and that has not been utilized in amplifying signal is passed into distributed pump-dump fiber segment 502, and is absorbed over its length.

Figure 6:
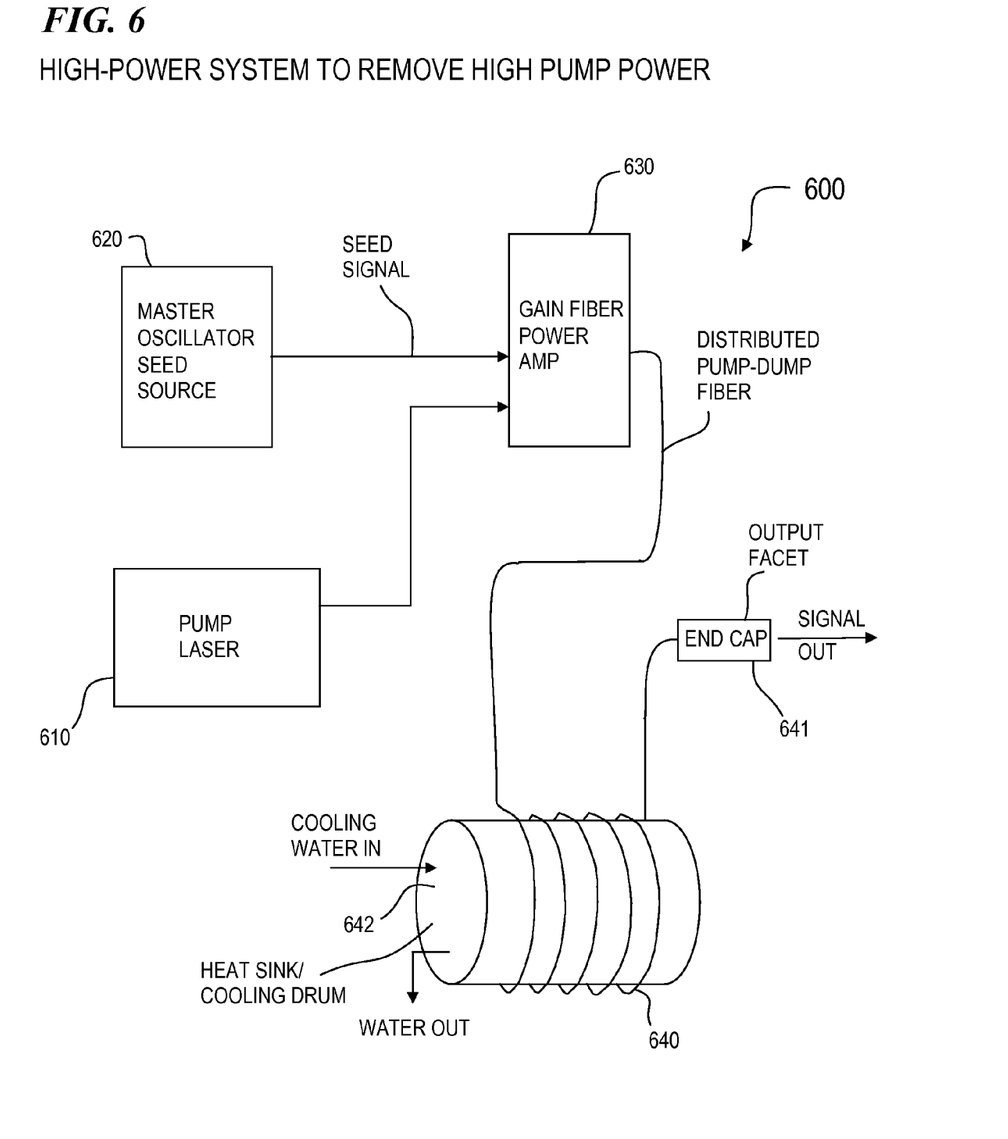
FIG. 6 is a block-diagram schematic of a master-oscillator/power-amplifier fiber laser and delivery fiber system 600.

FIG. 6 is a block-diagram schematic of a master-oscillator/power-amplifier fiber laser and delivery fiber system 600. In some embodiments, system 600 includes a laser pump 610 (e.g., pump laser diode bars and a combiner), a master oscillator 620 that generates a seed signal of the seed wavelength, a power amplifier 630 (e.g., a fiber amplifier dopes with an active dopant that absorbs the pump light and amplifies the seed signal, and which outputs the amplified signal that also includes a significant amount of unwanted pump light, and a pump-dump fiber 640 (e.g., wound around a heat sink such as a water-filled cylinder 642). At its end, some embodiments of delivery fiber 640 have an undoped endcap, such as fused silica, having an angled end facet. The pump light is largely absorbed over a length of the delivery fiber, as described above.

In some embodiments, the present invention provides an optical fiber (called a distributed pump-dump fiber) having a plurality of cladding layers for the delivery of an optical signal, the optical fiber including a first segment having a substantially transparent core and an attenuating cladding waveguide.

In some embodiments, in the first segment, the substantially transparent core is substantially transparent to at least a signal wavelength, wherein the core is surrounded by an inner cladding layer that includes a distributed region of a dopant that absorbs at least a signal wavelength, wherein the inner cladding is surrounded by a second cladding that contains light of the pump wavelength in the inner cladding.

Some embodiments further include an amplifying fiber segment spliced to one end of the first segment, wherein the amplifying segment includes an amplifying core having a dopant that absorbs pump light and amplifies signal light, wherein the amplifying core is surrounded by a cladding layer that forms a pump-wavelength waveguide.

Some embodiments further include a second segment spliced to an opposite end of the first segment, wherein a concentration of pump-wavelength dopant in the second segment is higher than a concentration of the pump-wavelength dopant in the first segment.

Some embodiments further include a third segment spliced to a far end of the second segment, wherein a concentration of pump-wavelength dopant in the third segment is higher than a concentration of the pump-wavelength dopant in the second segment.

In some embodiments, a concentration of a signal-wavelength dopant in the second segment is higher than a concentration of a signal-wavelength dopant in the third segment.

In some embodiments, a concentration of a signal-wavelength dopant in the first segment is higher than a concentration of a signal-wavelength dopant in the third segment.

In some embodiments, in the first segment, the attenuating cladding waveguide comprises a pump-wavelength absorbing material.

In some embodiments, an absorbing material is incorporated in the cladding by the insertion of one or more doped rods or cores.

In some embodiments, an absorbing material is deposited in an annulus in the cladding waveguide.

In some embodiments, the absorbing material is optically isolated from guided mode power in the core.

In some embodiments, the dopant comprises one or more rare-earth ions.

In some embodiments, the dopant comprises one or more transition metal ions.

In some embodiments, the dopant is cobalt.

In some embodiments, the dopant is ytterbium.

In some embodiments, the dopant is erbium.

In some embodiments, the dopant is thulium.

In some embodiments, the dopant is incorporated in such a manner that the ions form clusters.

Some embodiments further include an amplifying fiber device that includes at least one double-clad gain fiber optically coupled to the delivery fiber.

In some embodiments, the delivery fiber and gain fiber are fusion spliced. In some embodiments, the power loss of the splice to the outer coating or cladding material is less than 0.5 dB.

In some embodiments, the absorption of power propagating in the delivery fiber is greater than 6 dB. In some embodiments, the absorption of power propagating in the delivery fiber is greater than 10 dB. In some embodiments, the absorption of power propagating in the delivery fiber is greater than 20 dB. In some embodiments, the absorption of power propagating in the delivery fiber is greater than 30 dB. In some embodiments, the absorption of power propagating in the delivery fiber is greater than 40 dB. In some embodiments, the absorption of power propagating in the delivery fiber is greater than 60 dB. In some embodiments, the absorption of power propagating in the delivery fiber is greater than 80 dB. In some embodiments, the absorption of power propagating in the delivery fiber is greater than 100 dB. In some embodiments, the absorption of power propagating in the delivery fiber is greater than 120 dB.

In some embodiments, the power is absorbed over a sufficient length so that a packaged fiber laser device does not suffer failure as a result of dumping the unabsorbed pump power.

In some embodiments, the attenuation of residual pump power is sufficient to satisfy regulatory standards for eye-safety.

In some embodiments, the fiber is polarization maintaining.

In some embodiments, the transparent fiber core has normal dispersion for the lowest order guided mode of the core. In some embodiments, this is important for high-peak-power applications at eye-safe wavelengths where conventional LMA fibers (fibers with a large-mode-area core) have anomalous dispersion.

In some embodiments, the inner core has a pedestal refractive index profile. In some such embodiments, the outer pedestal has absorbing dopants.

In some embodiments, the cladding waveguide has a so-called air clad formed by a structure of glass bridges and air holes (this structure is also called a photonic-crystal structure that is used to define the inner cladding (wherein the photonic-crystal holes are used to confine the pump in the inner cladding)).

In some embodiments, the outer cladding comprises a low-index polymer

In some embodiments, the outer cladding comprises a low index glass such as fluorosilicate.

In some embodiments, the absorbing dopants are incorporated by solution doping.

In some embodiments, the absorbing dopants are inserted using a rod-in tube technique.

In some embodiments, the core is defined or formed by use of a photonic crystal fiber structure that defines the core (wherein the photonic-crystal holes are used to confine the signal in the core).

In some embodiments, the fiber is formed by a soft glass or where the fiber is manufactured by a technique other than chemical-vapor deposition. In some such embodiments, the soft glass is a chalcogonide. In some such embodiments, the soft glass is a telluride. In some such embodiments, the soft glass is a fluoride. In some such embodiments, the soft glass is bismuth based. In some such embodiments, the soft glass is a lead-silicate. In some such embodiments, the soft glass is a phosphate. In some such embodiments, the soft glass is a fluoro-phosphate. In some embodiments, these are important for applications using soft glass. These glasses typically have high refractive index making conventional pump dumping techniques using high-index polymers or oils difficult, toxic or otherwise impractical.

In some embodiments, the absorbing region is optically isolated for the lowest order mode of the nominally transparent core but optically coupled to higher order modes.

In some embodiments, the absorbing region is optically coupled to some of the modes of the fiber core and optically isolated from other modes.

In some embodiments, the absorbing region cleans up the beam profile of the transmitted signal.

In some embodiments, the fiber core is transparent at a signal wavelength but either un-guiding or attenuating at the first Raman shift from the signal. In some embodiments, this is important in cases where Raman is the limiting factor, which, for example would be the case with the successful implementation of the above described embodiment wherein the transparent fiber core has normal dispersion for the lowest order guided mode of the core, which, in some embodiments, is important for high-peak-power applications at eye-safe wavelengths where conventional LMA fibers have anomalous dispersion, for eye safe wavelengths and more generally for short wavelengths, such as one-micron wavelengths.

In some embodiments, the core is fabricated by a photonic bandgap structure.

In some embodiments, the core has multiple index layers to influence the properties of the guided signal.

In some embodiments, the core has at least one graded index segment.

In some embodiments, the fiber is formed by a soft glass and/or where the fiber is manufactured using a chemical-vapor-deposition technique.

In some embodiments, the fiber is manufactured by MCVD (modified chemical vapor deposition).

In some embodiments, the fiber is manufactured by OVD (outside chemical vapor deposition).

In some embodiments, the fiber is manufactured by VAD (vapor axial deposition).

In some embodiments, the fiber is manufactured by PCVD (plasma chemical vapor deposition).

In some embodiments, the present invention provides a fiber laser or amplifier comprising at least one double-clad gain fiber and the delivery fiber of one or more of the above paragraphs.

In some embodiments of the fiber laser or amplifier, the delivery fiber and gain fiber are fusion spliced.

In some embodiments of the fiber laser or amplifier, the power loss of the splice to the outer coating or cladding material is less than 0.5 dB.

In some embodiments of the fiber laser or amplifier, the absorption of power propagating in the delivery fiber is greater than 10 dB In some embodiments of the fiber laser or amplifier, the absorption of power propagating in the delivery fiber is greater than 100 dB.

In some embodiments of the fiber laser or amplifier, the power is absorbed over a sufficient length so that a packaged fiber laser device does not suffer failure because of dumping the unabsorbed pump power.

In some embodiments of the fiber laser or amplifier, the attenuation of residual pump power is sufficient to satisfy regulatory standards for eye-safety.

In some embodiments, the present invention provides a method that includes delivering pump light over a length of a fiber core of a gain fiber; amplifying a signal wavelength in the gain-fiber's core; and dumping pump light over a distributed length of a delivery fiber.

In some embodiments of the method, the dumping of pump light further comprises absorbing the pump light in an absorbing dopant.

In some embodiments, the method further includes actively cooling at least a portion of the delivery fiber.

In some embodiments, the method further includes absorbing signal-wavelength light in a cladding of the delivery fiber.

In some embodiments, the present invention provides an apparatus that includes a delivery fiber having a core and a gain fiber having a core, the delivery fiber operatively to the gain fiber; means for delivering pump light into the core of the gain fiber over a length of the core of the gain fiber; means for amplifying a signal wavelength in the core of the gain fiber; and means for dumping pump light over a distributed length of the delivery fiber.

In some embodiments, the means for dumping of pump light further comprises dopant means for absorbing the pump light.

Some embodiments further include means for actively cooling at least a portion of the delivery fiber.

Some embodiments further include means for absorbing signal-wavelength light in a cladding of the delivery fiber.

In some embodiments, the shape of the outer surface of the inner cladding is not round (i.e., in some embodiments, the cross-section shape used is hexagonal, octagonal, square, rectangular, "D"-shaped, or the like). This is done in order to mitigate the transmission of helical modes in the cladding of the fiber. Such non-circular designs are commonly employed in the designs of pump claddings for gain fibers. Such a design is shown in U.S. Pat. No. 4,815,079 to Snitzer et al., which describes an apparatus for coupling radiation into a single-mode core of an optical fiber laser that has a single-mode core disposed within a relatively large, multimode cladding at a location which is displaced from the center of the cross-section of the cladding. In FIG. 2 of the Snitzer et al. patent, a cross-sectional view of a fiber shows an inner cladding 210 with a rectangular shape. This cladding relies on a difference in its width and height to provide the desired mode mixing within. U.S. Pat. No. 6,157,763 issued Dec. 5, 2000 describe various cladding geometries. Another prior-art cladding design is shown in U.S. Pat. No. 5,864,645 to Zellmer, et al., wherein FIG. 2 of the Zellmer, et al. patent depicts the problem with helical modes in a double-clad fiber having a conventional inner cladding. Zellmer et al. address the problem of these helical modes by attempting to promote mode mixing by introducing a flat section into the otherwise circular cross section of the inner cladding outer surface. This inner cladding shape is shown in FIG. 3 of the Zellmer, et al. patent. In some embodiments, the present invention uses a combination of one or more of the approaches described in these three patents in combination with the cladding-absorption techniques and configurations described herein.

It is specifically contemplated that the present invention includes embodiments having combinations and subcombinations of the various embodiments and features that are individually described herein (i.e., some of the features from one embodiment combined with some of the features of another embodiment. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a continuous length of optical delivery fiber having a plurality of cladding layers for the delivery of an optical signal, the continuous length of delivery fiber including
      a first segment having a substantially transparent core and an attenuating cladding waveguide doped with a first concentration of an absorbing dopant that includes at least one element selected from the group consisting of transition metals and rare-earth elements, and that absorbs light of a first predetermined wavelength, and
      a second segment having a substantially transparent core and an attenuating cladding waveguide doped with a second concentration of an absorbing dopant that includes at least one element selected from the group consisting of transition metals and rare-earth elements, and that absorbs light of the first predetermined wavelength, wherein the second concentration is higher than the first concentration.

2. The apparatus of claim 1, wherein in the first segment of the delivery fiber, the substantially transparent core is substantially transparent to at least a signal wavelength, wherein the core is surrounded by an inner cladding layer having a distributed region of a dopant that absorbs at least a pump wavelength, wherein the inner cladding is surrounded by a second cladding that guides light of the pump wavelength in the inner cladding.

3. The apparatus of claim 1, further comprising an amplifying fiber segment spliced to a first end of the first segment of the delivery fiber, wherein the amplifying segment includes an amplifying core having a dopant that absorbs pump light and amplifies signal light, wherein the amplifying core is surrounded by a cladding layer that forms a pump-wavelength waveguide.

4. The apparatus of claim 3, wherein the second segment is spliced directly to a second end of the first segment that is opposite the first end of the first segment.

5. The apparatus of claim 1, wherein in the first segment, the first predetermined wavelength absorbed in the attenuating cladding waveguide by the absorbing dopant is a pump wavelength.

6. The apparatus of claim 5, wherein the absorbing dopant is optically isolated from guided mode power in the core.

7. The apparatus of claim 5, wherein the absorbing dopant includes at least one element selected from the group consisting of rare-earth elements.

8. The apparatus of claim 5, wherein the absorbing dopant includes at least one element selected from the group consisting of transition metals.

9. The apparatus of claim 5, wherein the absorbing dopant includes cobalt.

10. The apparatus of claim 5, wherein the absorbing dopant includes ytterbium.

11. The apparatus of claim 5, wherein the absorbing dopant includes erbium.

12. The apparatus of claim 5, wherein the absorbing dopant includes thulium.

13. The apparatus of claim 5, wherein the absorbing dopant is incorporated in such a manner that ions of the absorbing dopant form clusters.

14. The apparatus of claim 1, wherein the absorbing dopant is incorporated in the cladding of the first segment in one or more doped rod-shaped structures.

15. The apparatus of claim 1, wherein the absorbing dopant is located in an annulus in the cladding waveguide of the first segment that surrounds the core.

16. The apparatus of claim 1, further comprising:
   an amplifying fiber device that includes at least one double-clad gain fiber optically coupled to the delivery fiber.

17. The apparatus of claim 16, wherein the delivery fiber and gain fiber are fusion spliced to one another.

18. The apparatus of claim 17, wherein a power loss associated with the fusion splice is less than 0.5 dB.

19. The apparatus of claim 17, wherein an absorption of power propagating in the delivery fiber is greater than 6 dB.

20. The apparatus of claim 17, wherein an absorption of power propagating in the delivery fiber is greater than 20 dB.

21. The apparatus of claim 17, wherein an absorption of power propagating in the delivery fiber is greater than 120 dB.

22. The apparatus of claim 1, wherein the fiber is polarization maintaining.

23. The apparatus of claim 1, wherein the transparent core has normal dispersion for a lowest order guided mode of the core.

24. The apparatus of claim 1, wherein the fiber is made from a soft glass.

25. The apparatus of claim 24, wherein the soft glass includes a chalcogonide.

26. The apparatus of claim 1, wherein the absorbing dopant in the first segment is located in an absorbing region that is optically isolated from a lowest-order mode of the core but optically coupled to higher-order modes.

27. The apparatus of claim 1, wherein the core includes deposited nanoparticles.

28. The apparatus of claim 1, wherein the first segment is spliced directly to the second segment.

29. The apparatus of claim 1, wherein the first segment is closer to a signal-input end of the delivery fiber than is the second segment, and wherein the first predetermined wavelength is a pump wavelength.

30. The apparatus of claim 1, further comprising an endcap spliced directly to a signal-output end of the delivery fiber, wherein the endcap is configured to increase a beam diameter of the optical signal.

31. The apparatus of claim 1, further comprising a water-cooled drum, wherein at least a portion of the optical delivery fiber is wound around the drum.

32. An apparatus comprising:
an optical delivery fiber having a plurality of cladding layers for the delivery of an optical signal, the delivery fiber including a first segment having a substantially transparent core and an attenuating cladding waveguide, wherein the attenuating cladding waveguide of the first segment includes a pump-wavelength-absorbing dopant, and wherein the pump-wavelength-absorbing dopant includes at least one element selected from the group consisting of transition metals and rare-earth elements, and;
an amplifying fiber segment spliced to a first end of the first segment of the delivery fiber, wherein the amplifying segment includes an amplifying core having a dopant that absorbs pump light and amplifies signal light, wherein the amplifying core is surrounded by a cladding layer that forms a pump-wavelength waveguide;
a second segment spliced to a second end of the first segment that is opposite the first end of the first segment, wherein a concentration of a pump-wavelength dopant in the second segment is higher than a concentration of the pump-wavelength dopant in the first segment; and
a third segment spliced to a far end of the second segment relative to the first segment, wherein a concentration of pump-wavelength dopant in the third segment is higher than the concentration of the pump-wavelength dopant in the second segment.

33. An apparatus comprising:
an optical delivery fiber having a plurality of cladding layers for the delivery of an optical signal, the delivery fiber including a first segment having a substantially transparent core and an attenuating cladding waveguide;
an amplifying fiber segment spliced to a first end of the first segment of the delivery fiber, wherein the amplifying segment includes an amplifying core having a dopant that absorbs pump light and amplifies signal light, wherein the amplifying core is surrounded by a cladding layer that forms a pump-wavelength waveguide;
a second segment spliced to a second end that is opposite the first end of the first segment, wherein a concentration of a pump-wavelength dopant in the second segment is higher than a concentration of a pump-wavelength dopant in the first segment; and
a third segment spliced to a far end of the second segment relative to the first segment, wherein a concentration of pump-wavelength dopant in the third segment is higher than the concentration of the pump-wavelength dopant in the second segment, wherein a concentration of a signal-wavelength dopant in the second segment is higher than a concentration of a signal-wavelength dopant in the third segment.

34. An apparatus comprising:
an optical delivery fiber having a plurality of cladding layers for the delivery of an optical signal, the delivery fiber including a first segment having a substantially transparent core and an attenuating cladding waveguide;
an amplifying fiber segment spliced to a first end of the first segment of the delivery fiber, wherein the amplifying segment includes an amplifying core having a dopant that absorbs pump light and amplifies signal light, wherein the amplifying core is surrounded by a cladding layer that forms a pump-wavelength waveguide;
a second segment spliced to a second end that is opposite the first end of the first segment, wherein a concentration of a pump-wavelength dopant in the second segment is higher than a concentration of a pump-wavelength dopant in the first segment; and
a third segment spliced to a far end of the second segment relative to the first segment, wherein a concentration of pump-wavelength dopant in the third segment is higher than the concentration of the pump-wavelength dopant in the second segment, wherein a concentration of a signal-wavelength dopant in the first segment is higher than a concentration of a signal-wavelength dopant in the third segment.

35. A method comprising:
providing a continuous length of fiber that includes a delivery fiber having a core and a gain fiber having a core, the delivery fiber operatively coupled to the gain fiber;
delivering pump light into the core of the gain fiber over a length of the core of the gain fiber;
amplifying a signal wavelength in the core of the gain fiber; and
dumping pump light at a first rate over a distributed length of a first segment of the delivery fiber and dumping pump light at a second rate over a distributed length of a second segment of the delivery fiber, wherein the first rate is lower than the second rate, wherein the providing of the delivery fiber includes providing a plurality of cladding layers surrounding the core including a pump-light-guiding inner cladding having a pump-light-absorbing dopant that is concentrated in the inner cladding, wherein the dumping of pump light further includes absorbing the pump light in the pump-light-absorbing dopant, and wherein the pump-light-absorbing dopant includes at least one element selected from the group consisting of transition metals and rare-earth elements.

36. The method of claim 35, further comprising:
actively cooling at least a portion of the delivery fiber.

37. The method of claim 35, further comprising:
delivering signal light through the core of the delivery fiber; and
absorbing signal-wavelength light in the inner cladding of the delivery fiber.

38. The method of claim 35, wherein the absorbing of the pump light is substantially confined within a cladding layer outside the core.

39. The method of claim 35, wherein the providing of the delivery fiber includes providing a gradually changing concentration of the pump-light-absorbing dopant from a lower concentration of pump-light-absorbing dopant near a signal-input end of the delivery fiber to a higher concentration of pump-light-absorbing dopant near a signal-output end of the delivery fiber.

40. The method of claim 35, wherein the providing of the delivery fiber includes fabricating the core by nanoparticle deposition.

41. An apparatus comprising:
a continuous length of fiber that includes a delivery fiber having a core and a gain fiber having a core, the delivery fiber operatively coupled to the gain fiber;
means for delivering pump light into the core of the gain fiber over a length of the core of the gain fiber;
means for amplifying a signal wavelength in the core of the gain fiber; and
means for dumping pump light at a first rate over a distributed length of a first segment of the delivery fiber and means for dumping pump light at a second rate over a distributed length of a second segment of the delivery fiber, wherein the first rate is lower than the second rate, wherein the means for dumping of pump light further includes dopant means for absorbing the pump light, and wherein the dopant means includes at least one element selected from the group consisting of transition metals and rare-earth elements.

42. The apparatus of claim 41, further comprising:
means for actively cooling at least a portion of the delivery fiber.

43. The apparatus of claim 41, further comprising:
means for delivering signal light through the core of the delivery fiber; and
means for absorbing signal-wavelength light in a cladding of the delivery fiber.

44. The apparatus of claim 41, wherein the dopant means is substantially confined within a cladding layer outside the core.

45. The apparatus of claim 41, wherein a concentration of the dopant means gradually changes from a lower concentration of dopant means near a signal-input end of the delivery fiber to higher concentration of dopant means near a signal-output end of the delivery fiber.

46. An apparatus comprising:
an optical delivery fiber having a plurality of cladding layers for the delivery of an optical signal, the delivery fiber including
a first segment having
a substantially transparent core, an attenuating cladding waveguide, and an outer cladding that surrounds the attenuating cladding waveguide, wherein the substantially transparent core has a substantially unchanging core diameter in the first segment,
wherein the attenuating cladding waveguide has a substantially unchanging cladding diameter in the first segment, wherein the attenuating cladding waveguide includes a first absorbing region having a first dopant that includes at least one element selected from the group consisting of transition metals and rare-earth elements, and that absorbs pump light in the attenuating cladding waveguide of the first segment, wherein the first absorbing region that is in the attenuating cladding waveguide does not surround the core in a continuous annular manner,
wherein the attenuating cladding waveguide includes a second absorbing region having a second dopant, and wherein the second dopant is different than the first dopant.

47. The apparatus of claim 46, wherein the second dopant in the second absorbing region includes at least one element selected from the group consisting of transition metals and rare-earth elements, and wherein the second dopant absorbs signal light.

48. An apparatus comprising:
an optical delivery fiber having a plurality of cladding layers for the delivery of an optical signal, the delivery fiber including a first segment having a substantially transparent core and an attenuating cladding waveguide, wherein the attenuating cladding waveguide of the first segment includes a distributed absorbing region having dopant concentration that gradually changes from a lower concentration of a pump-wavelength-absorbing dopant that includes at least one element selected from the group consisting of transition metals and rare-earth elements, and that is located closer to a signal-input end of the delivery fiber than to the signal-output end to a higher concentration of the pump-wavelength-absorbing dopant closer to the signal-output end of the delivery fiber than to the signal-input end.

49. A method comprising:
providing a delivery fiber having a first segment that has
a core having a substantially unchanging core diameter in the first segment,
a plurality of cladding layers surrounding the core including a pump-light-guiding inner cladding that surround the core and an outer cladding that surrounds the inner cladding,
wherein the inner cladding has a substantially unchanging inner-cladding diameter in the first segment, wherein the inner cladding includes a first absorbing region having a first dopant that absorbs pump light and includes at least one element selected from the group consisting of transition metals and rare-earth elements, wherein the first dopant is not in a continuous annular distribution surrounding the core, wherein the inner cladding includes a second absorbing region having a second dopant that absorbs light, and wherein the second dopant is different than the first dopant;
providing a gain fiber having a core, the delivery fiber operatively coupled to the gain fiber;
delivering pump light into the core of the gain fiber over a length of the core of the gain fiber;
amplifying a signal wavelength in the core of the gain fiber; and
dumping pump light over a distributed length of the first segment of the delivery fiber, wherein the dumping of pump light further comprises absorbing the pump light in the first region of pump-light-absorbing dopant, and wherein the absorbing of the pump light is concentrated in at least one non-annular portion of the inner cladding surrounding the core in the first segment.

50. The method of claim 49, wherein the second dopant in the second absorbing region includes at least one element selected from the group consisting of transition metals and rare-earth elements, and wherein the second dopant absorbs signal light.

51. An apparatus comprising:
a delivery fiber having a first segment that has
a core having a substantially unchanging core diameter in the first segment, and
a plurality of cladding layers surrounding the core including a pump-light-guiding inner cladding that surround the core and an outer cladding that surrounds the inner cladding, wherein the inner cladding has a substantially unchanging inner-cladding diameter in the first segment;
a gain fiber having a core, the delivery fiber operatively coupled to the gain fiber;
means for delivering pump light into the core of the gain fiber over a length of the core of the gain fiber;
means for amplifying a signal wavelength in the core of the gain fiber; and
means for dumping light over a distributed length of the first segment of the delivery fiber, wherein the means for dumping light further comprises a first dopant means for absorbing pump light, wherein the first dopant means includes at least one element selected from the group consisting of transition metals and rare-earth elements, and wherein the first dopant means is located in the inner cladding and does not surround the core in a continuous annular manner, wherein the means for dumping light further includes a second dopant means for absorbing light, wherein the second dopant means is different than the first dopant means, and wherein the second dopant means is located in the inner cladding.

52. The apparatus of claim 51, wherein the second dopant means includes at least one element selected from the group consisting of transition metals and rare-earth elements, and wherein the second dopant means absorbs signal light.

53. An apparatus comprising:
a continuous length of optical delivery fiber having a plurality of cladding layers for the delivery of an optical signal, the continuous length of delivery fiber including
a first segment having a substantially transparent core and an attenuating cladding waveguide doped with a first concentration of an absorbing dopant that absorbs light of a first predetermined wavelength, and
a second segment having a substantially transparent core and an attenuating cladding waveguide doped with a second concentration of an absorbing dopant that absorbs light of the first predetermined wavelength, wherein the second concentration is higher than the first concentration, wherein the first predetermined wavelength is a signal wavelength.

54. An apparatus comprising:
a continuous length of optical delivery fiber having a plurality of cladding layers for the delivery of an optical signal, the continuous length of delivery fiber including
a first segment having a substantially transparent core and an attenuating cladding waveguide doped with a first concentration of an absorbing dopant that absorbs light of a first predetermined wavelength, and
a second segment having a substantially transparent core and an attenuating cladding waveguide doped with a second concentration of an absorbing dopant that absorbs light of the first predetermined wavelength, wherein the second concentration is higher than the first concentration, wherein the second segment is closer to a signal-input end of the delivery fiber than is the first segment, and wherein the first predetermined wavelength is a signal wavelength.

55. An apparatus comprising:
a continuous length of optical delivery fiber having a plurality of cladding layers for the delivery of an optical signal, the continuous length of delivery fiber including
a first segment having a substantially transparent core and an attenuating cladding waveguide doped with a first concentration of an absorbing dopant that absorbs light of a first predetermined wavelength, and
a second segment having a substantially transparent core and an attenuating cladding waveguide doped with a second concentration of an absorbing dopant that absorbs light of the first predetermined wavelength, wherein the second concentration is higher than the first concentration, wherein the first segment is closer to a signal-input end of the delivery fiber than is the second segment, wherein the first predetermined wavelength is a pump wavelength,
wherein the absorbing dopant in the first segment and the absorbing dopant in the second segment are both a first absorbing dopant,
wherein the attenuating cladding waveguide of the first segment is also doped with a second absorbing dopant that absorbs light of a second predetermined wavelength, and the attenuating cladding waveguide of the second segment is also doped with the second absorbing dopant that absorbs light of the second predetermined wavelength,
wherein the second predetermined wavelength is a signal wavelength, and
wherein a concentration of the second dopant in the attenuating cladding waveguide of the second segment is lower than a concentration of the second dopant in the attenuating cladding waveguide of the first segment.

56. A method comprising:
providing a continuous length of fiber that includes a delivery fiber having a core and a gain fiber having a core, the delivery fiber operatively coupled to the gain fiber;
delivering pump light into the core of the gain fiber over a length of the core of the gain fiber;
amplifying a signal wavelength in the core of the gain fiber;
dumping pump light over a distributed length of the delivery fiber; and
actively cooling at least a portion of the delivery fiber at a location on the delivery fiber where the dumping of pump light occurs.

57. An apparatus comprising:
a continuous length of fiber that includes a delivery fiber having a core and a gain fiber having a core, the delivery fiber operatively coupled to the gain fiber;
means for delivering pump light into the core of the gain fiber over a length of the core of the gain fiber;
means for amplifying a signal wavelength in the core of the gain fiber;
means for dumping pump light over a distributed length of the delivery fiber; and
means for actively cooling at least a portion of the delivery fiber at a location on the delivery fiber where the means for dumping pump light is located.

* * * * *